A. W. PROCTOR, DEC'D.
G. H. PROCTOR, ADMINISTRATRIX.
TRANSMISSION MECHANISM.
APPLICATION FILED NOV. 17, 1911. RENEWED JAN. 18, 1918.

1,258,143.

Patented Mar. 5, 1918.
6 SHEETS—SHEET 1.

WITNESSES

INVENTOR

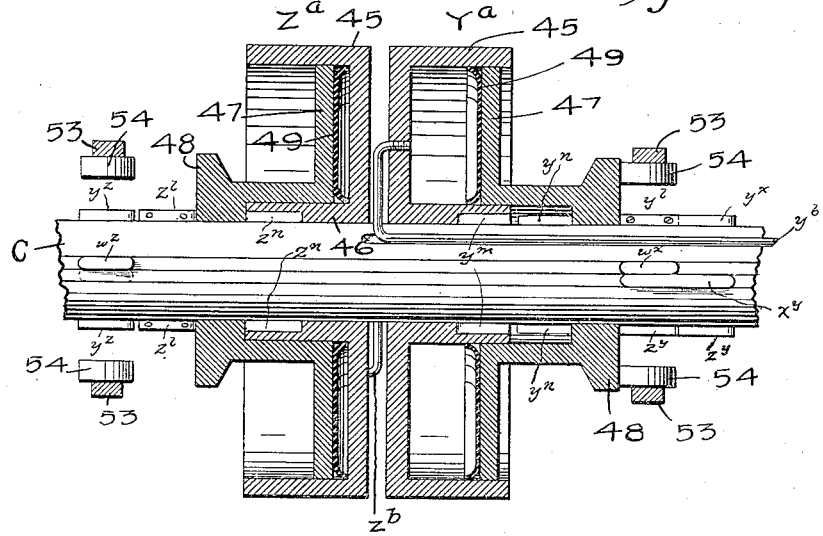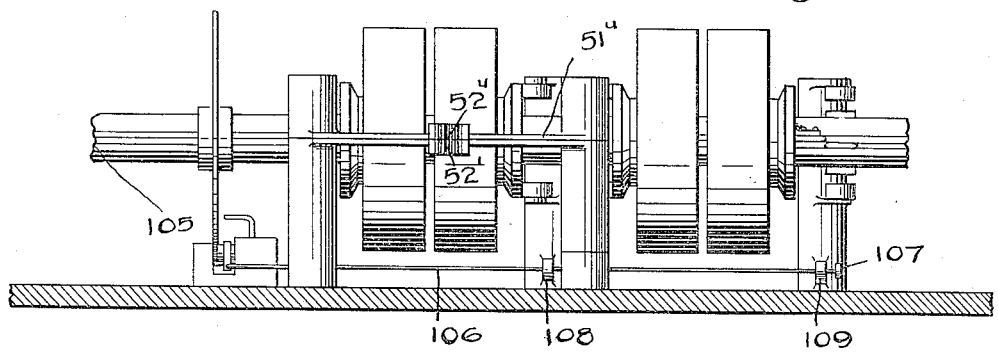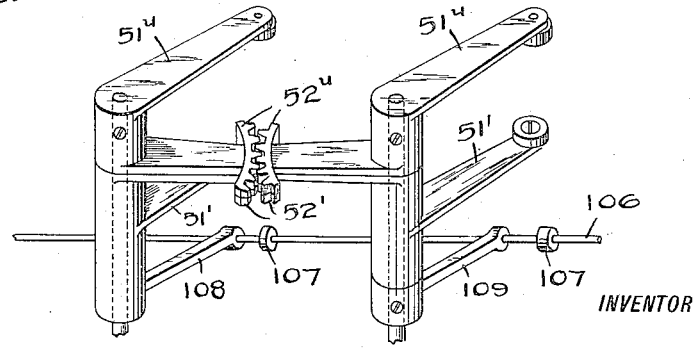

A. W. PROCTOR, DEC'D.
G. H. PROCTOR, ADMINISTRATRIX.
TRANSMISSION MECHANISM.
APPLICATION FILED NOV. 17, 1911. RENEWED JAN. 18, 1918.

1,258,143.

Patented Mar. 5, 1918.
6 SHEETS—SHEET 3

WITNESSES

INVENTOR

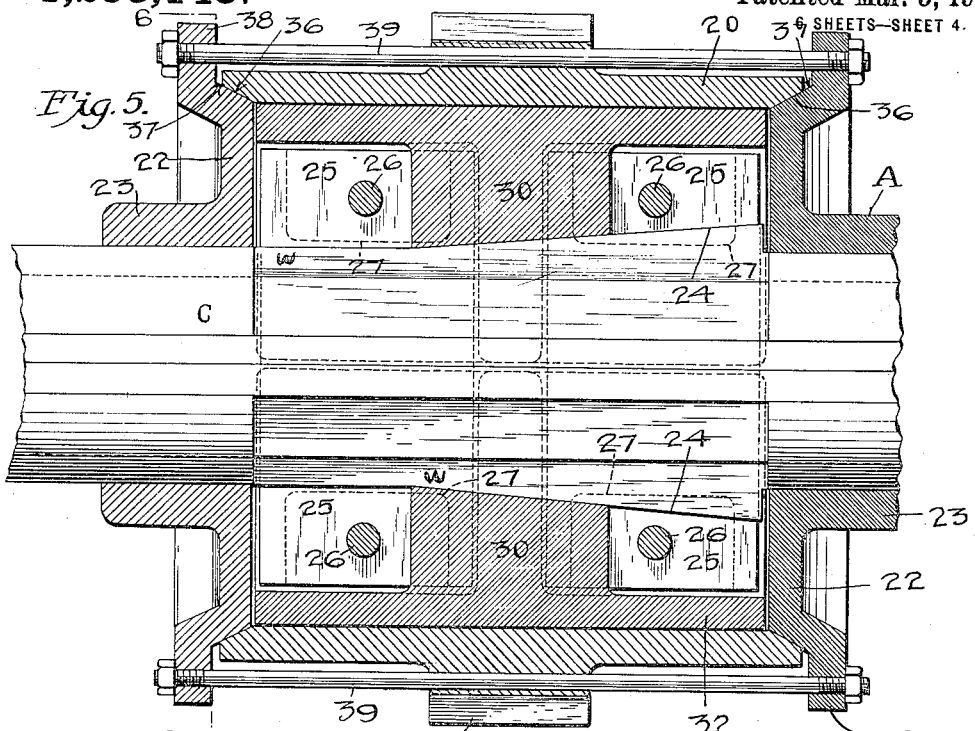
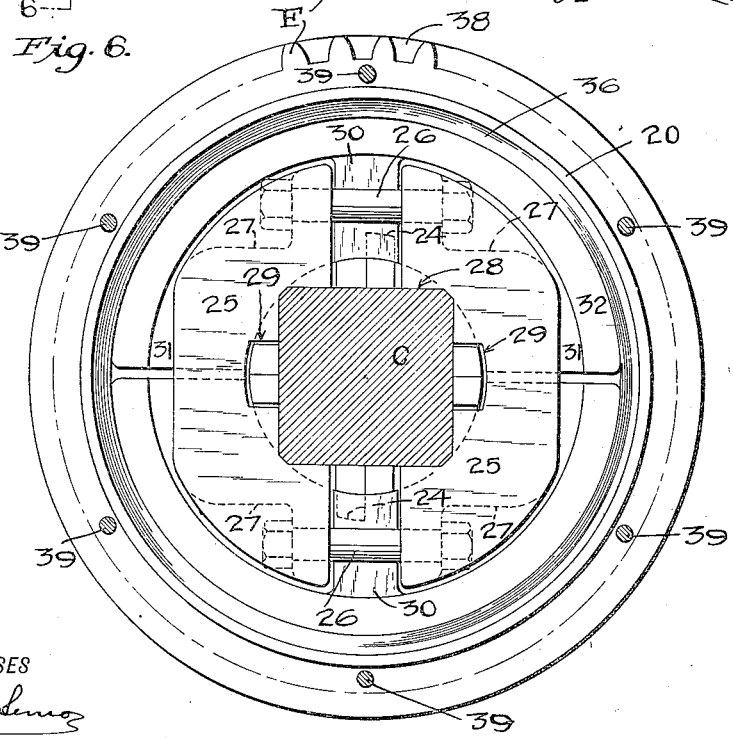

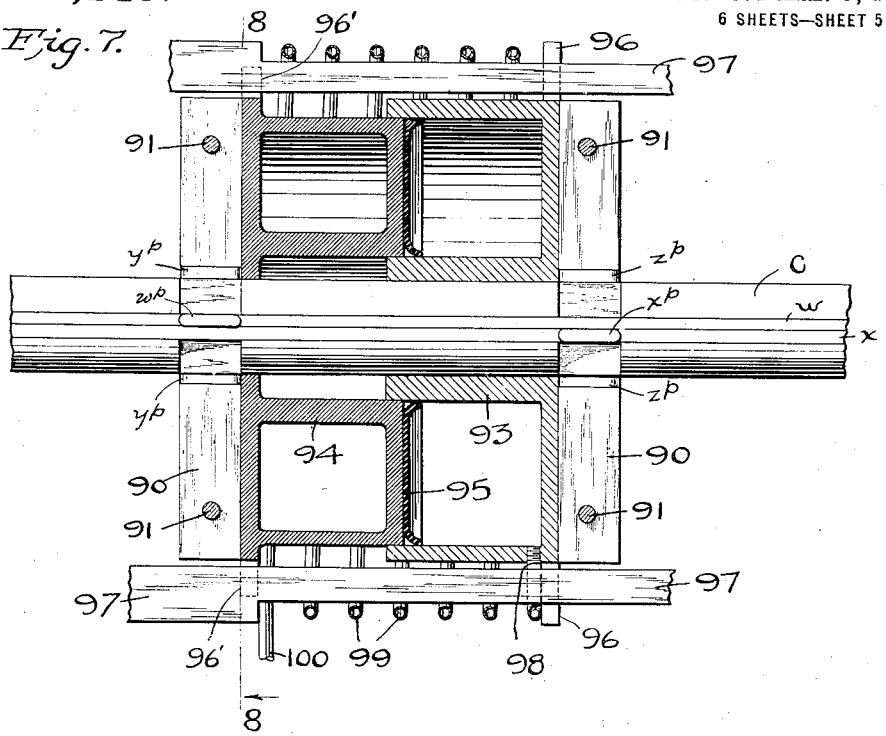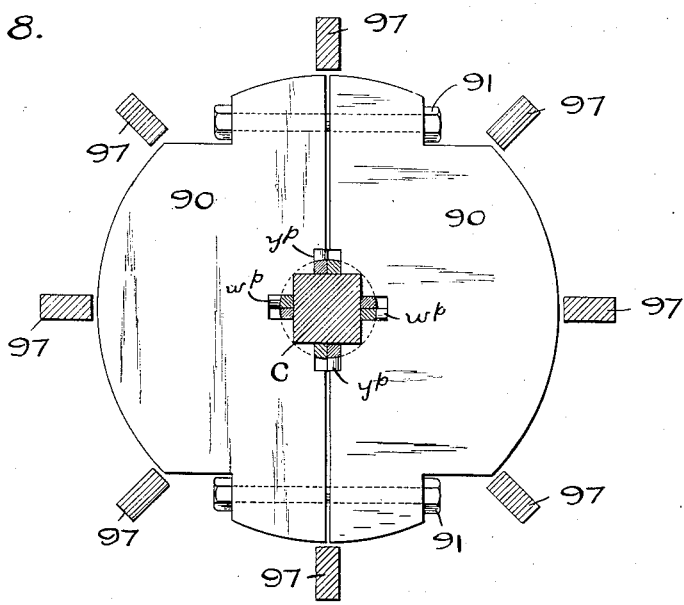

UNITED STATES PATENT OFFICE.

ALFRED W. PROCTOR, OF BROOKLYN, NEW YORK; GEORGIETTA H. PROCTOR, ADMINISTRATRIX OF SAID ALFRED W. PROCTOR, DECEASED, ASSIGNOR, BY MESNE ASSIGNMENTS, TO FRANCIS A. SHEA, OF BOSTON, MASSACHUSETTS.

TRANSMISSION MECHANISM.

1,258,143.   Specification of Letters Patent.   Patented Mar. 5, 1918.

Application filed November 17, 1911, Serial No. 660,749. Renewed January 18, 1918. Serial No. 212,536.

*To all whom it may concern:*

Be it known that I, ALFRED WATERS PROCTOR, a citizen of the United States, and a resident of Brooklyn, in the county of Kings and State of New York, have invented certain new and useful Improvements in Transmission Mechanism, of which the following is a specification.

This invention relates to transmission mechanism for motor vehicles. So far as I am aware, the sliding gear has largely held its place as a transmission mechanism against many other plans which promise greater ease of manipulation, mainly for the reason that the sliding gear gives an actual increase in torque which is very close to the theoretical torque increase due to the speed reduction. In other words, the plan of a simple counter shaft with two gear reductions connecting it to the engine and to the driven shaft is perhaps as perfect a means of obtaining speed reduction and proportionate torque increase as can be devised. The difficulty of course is that of shifting from one speed to another. This includes the subsidiary difficulty of abruptness in the change from one speed to another, assuming that the manipulation is so skilful as to be eliminated as an unfavorable factor. It is unnecessary to point out the many evils which result from these conditions. It is a purpose of my invention to provide a mechanism which has all or substantially all the advantages of the standard sliding gear, but which completely eliminates the two essential difficulties thereof together with the numerous subsidiary difficulties and evils which are well known. With this object in view the invention consists in the improved transmission mechanism as hereinafter set forth.

In the drawings,—

Fig. 2, is a partial vertical longitudinal section of the air cylinder end of the mechanism shown in Fig. 1;

Fig. 5, is a similar section taken toward the extreme left of Fig. 1;

Fig. 6, is a section of the same taken generally on the line 6—6 of Fig. 5, with certain of the parts removed;

Fig. 7, is a section similar to Fig. 2 taken toward the middle of Fig. 1, and showing parts broken away or omitted in Fig. 1;

Fig. 8, is a section on the line 8—8 of Fig. 7, looking in the direction of the arrow;

Figure 1:
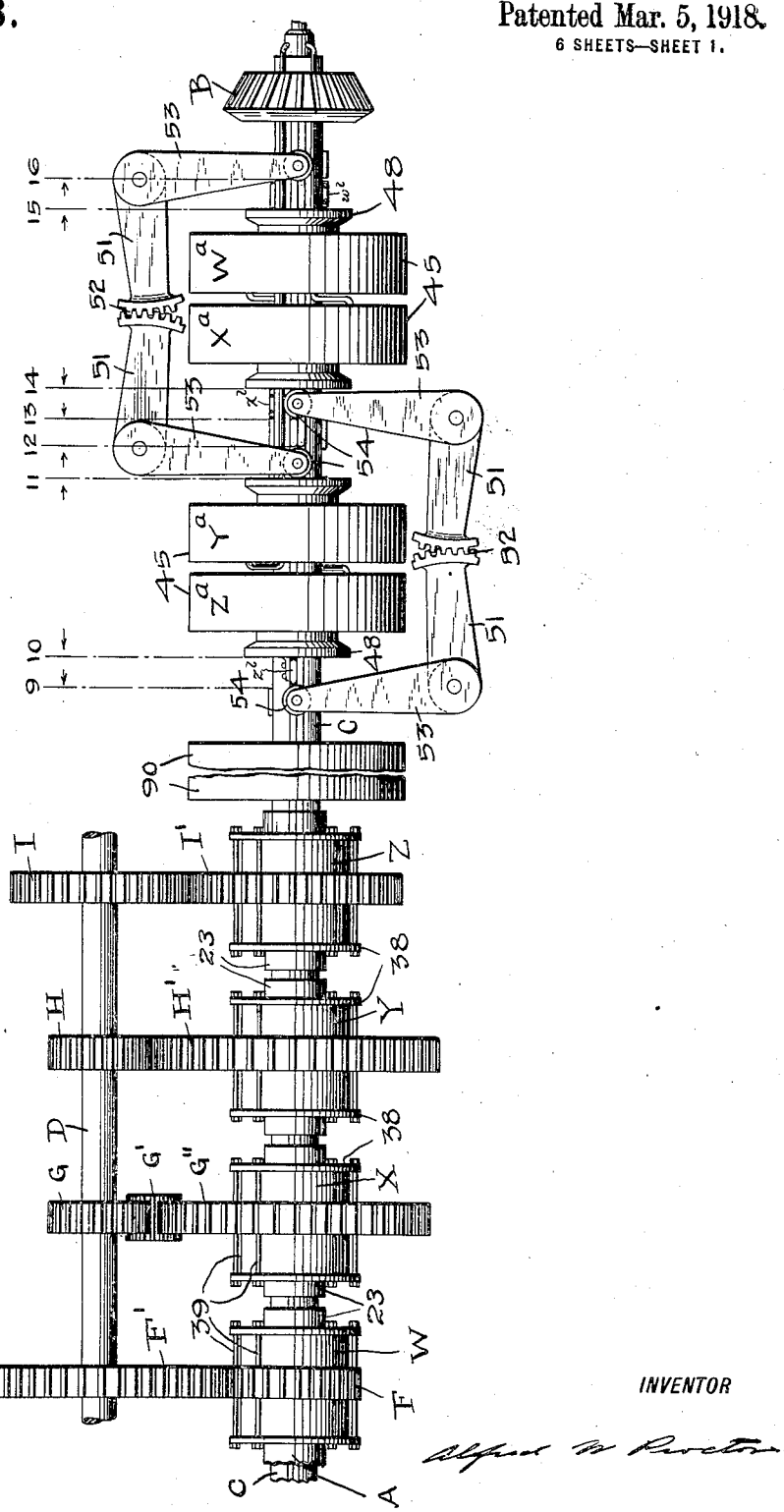
Figure 1, is a top plan view of the main part of a transmission mechanism embodying the principles of my invention.

Figs. 9 to 16 inclusive, are detail sections of the transmission shaft, and certain sliding rods forming part thereof, these sections being taken on the lines 9, 10, 11, 12, 13, 14, 15 and 16 of Fig. 1, looking in the direction of the arrows;

Figs. 17 and 18, are respectively side elevational and perspective views of a modification.

A denotes the engine shaft or a sleeve which is fixed to the engine shaft and which always rotates therewith. B denotes a gear forming part of the usual differential gearing, which latter constitutes no part of the present invention and may be of any suitable or desired form. C is the transmission shaft and D is a counter shaft, and these shafts will rotate in fixed bearings in the frame of the machine, as many bearings being provided as possible in the interests of strength, rigidity, lubrication and freedom from wear. The whole mechanism is of a form adapted to be incased in a single oil and dust proof casing, the casing including also the differential gearing which is not shown. Under these circumstances the only parts which project through the casing are the engine shaft or sleeve A, and the two transverse shafts which lead from the differential gearing not shown. With these points in mind the provision of the casing is a simple matter and for that reason it has been omitted, in the interest of clearness, from this specification, except that in Fig. 17 a portion of the lower wall appears.

F and F', G, G' and G'', H and H', I and I', are gears, of which F is fixed to and always rotates with the engine shaft, while F', G, H and I are fixed to and always rotate with the counter shaft D. F, G'', H' and I', are in permanent mesh with the gears F', G, H and I, except that G and G'' are connected through an intermediate idler G'. The gears G'', H' and I', and the sleeve A, are designed to be clutched selectively to the transmission shaft C. This particular arrangement of gears is sometimes known as a fixed gear system, and of course requires clutches for each pair of intermeshing gears. So far as I am aware this system has been confined to use in practice with positive clutches, on account of the large size and difficulty of operating a plurality of friction clutches. Of course with positive clutches substantially all the difficulties of a sliding gear are present.

In order to make clear the nature of the present improvement, it is perhaps necessary to say that friction clutches are ordinarily thrown into action by a powerful spring, in order that there will not be any end thrust on the transmission shaft while the latter is running. The large size of friction clutches is obviously necessary with any ordinary arrangement of mechanism in order to transmit the exceedingly high turning moments through the mere agency of friction. The provision of several very large friction clutches with their operating springs and system of sufficiently strong trains of levers for throwing out the various friction clutches has entirely prevented their use for the purposes of the fixed gear system just mentioned, as far as I am aware. It is the main purpose of the present invention to provide a special arrangement of clutches which are so interlocked in their action that when any one is thrown in the others are positively thrown out, and in which the mere power of a spring is not relied upon, but in which a direct power means or prime mover is utilized which is furthermore so direct in its application of power to the clutches as to make exceedingly small friction devices adequate to serve the purposes of clutches in the mechanism. As will later appear, the power means employed is a part of the transmission shaft so that its direct application for operating the clutches does not produce any end thrust on the shaft, which otherwise would be a prohibitive consideration. Nor are springs used for releasing the clutches because the latter are so interlocked that the action of any one positively effects the release of all the others. For the purposes of releasing all simultaneously a positive connection from the brake is utilized.

Briefly therefore the present invention consists in a system of air operated interlocking clutches which are so constructed, and so related to one another in their construction, that they throw one another positively out of action and are all thrown into action by a direct application of power transmitted immediately thereto from a prime mover or power source. That is to say, the power is not transmitted through cranks, axles, levers, etc., but is transmitted by a direct push or pull. This arrangement necessitates several independent air pressure connections to the rotating transmission shaft, and this is accomplished by the present invention. As will later appear, the complete control of the mechanism is effected by applying air pressure selectively to a plurality of separate air pipes which run to the point of control at the driver's seat. The application of air selectively to any pipe can be simply effected by a single lever or "engineer's valve" which constitutes the sole controlling means of the whole mechanism. It is of course obvious that electricity may be employed as a motive force in place of air, the sole difference being that insulated wires will be run wherever the air pipes are run by the present specification, and solenoids or magnets provided wherever pneumatic cylinders are provided in the present specification.

Referring now more particularly to Fig. 5, the interior of one of the clutches with a portion of its operating means on the transmission shaft is particularly shown. For convenience the various clutches may be designated X, Y, Z and W, see Fig. 1, and the clutch actually shown is the clutch W, Fig. 1, which is part of the sleeve A fixed to the engine shaft as already described.

The best constructions embodying the invention will include a transmission shaft C which is cut or milled away at locations extending throughout the interiors of the clutches, so that the shaft has a square or substantially square section at these places. Thus in Fig. 5, where the clutch comprises a sleeve 20 joined to flanges 22 having bearings 23 on the transmission shaft, the transmission shaft is squared to a transverse section shown in Fig. 6 for the entire distance between the bearings 23. In addition to being squared in this way, the transmission shaft C will have a plurality of splined grooves extending longitudinally thereof for its entire length (see Figs. 9 to 16). Within each of these grooves a rod or rods will slide, and two rods in each of four splined grooves constitute the best construction. These rods are slidable independently longitudinally in the splines and operate invariably together in diametrically opposite pairs. Referring particularly to Figs. 9 to 16 which show different transverse sections of the transmission shaft, the rods are lettered $w$, $x$, $y$, $z$, the diametrically opposite rods of the corresponding pair being given the same reference letters since they are identical in construction, function and movement. This duplication is of course not necessary, but gives a better balance as will later appear.

In connection with Figs. 9 to 16, it will be noted that Figs. 11, 12, 15 and 16 are sections looking in an opposite direction to those of Figs. 9, 10, 13 and 14, so that the position of the rods appears transposed, although as a matter of fact it is not.

The rods $w$, $w$, are parts of the clutch W, the rods $x$, $x$, parts of the clutch X, the rods $y$, $y$, parts of the clutch Y, and the rods $z$, $z$, parts of the clutch Z. Returning now to Fig. 5, it will be seen that the rods $w$, $w$, have wedges or inclines 24 thereon so that when the rods are shifted longitudinally, the wedges will be given a wedging movement. The relation of the splines and square portions of the transmission shaft is such that the wedges rest directly against the flat faces of the square portions of the shaft. There is enough lost motion or looseness so that the wedges are never fully tightened until the clutch rods have completed at least half their normal throw.

Also coöperating with this square portion of the shaft, I provide a pair of clamps each of which comprises two yokes 25 of substantially segmental shape drawn together by bolts 26. In order to provide spaces for the heads of the bolts 26, the segmental yokes are recessed angularly inward, as shown in dotted lines 27 in Figs. 5 and 6. On their interior faces the yokes have rectangular recesses 28 for the square portion of the transmission shaft and are further recessed at 29 so as to permit an unimpeded sliding movement of the various clutch rods.

The yokes 25 of each pair have a clear open space between them as clearly shown in Fig. 6, and the two complete clamps also have a space between them of about the same width. Into these spaces extend webs 30 and 31 of the shoes 32 which are semi-cylindrical and substantially fill the interior of the sleeve 20. The web 31 of each shoe is a central web in the plane of rotation of the transmission shaft, and greatly stiffens the shoes against bending. This web is of course cut away so far as is necessary to accommodate the transmission shaft and the clutch rods. The other web 30 of the shoe is a longitudinally extending web or lug, which however has a total length less than the distance between the bolts 26 (see Fig. 5).

The result of the construction just described is that the two clutch shoes are very stiff and strong and yet of simple construction, and are permitted to have a movement toward and away from one another, and with relation to the transmission shaft, but are powerfully constrained to rotate with the transmission shaft on account of the clamps 25. The location of the wedges 24 is furthermore such that they impinge against the lugs 30, and the latter have inclined faces so as to make a good bearing engagement between the surfaces. Of course any suitable facings for the engaging surfaces can be supplied if desired.

Also for the purposes of providing against wear, the bearings 23 are adjustable and the sleeve 20 of the clutch is readily removable so that the shoes can be taken out and inspected, renewed, or repaired, as necessity requires. In order to permit these various services, and also to insure a truly concentric rotation of the sleeve after any adjustment for wear, I make the sleeve 20 independent from the flanges 22 at each end, but having a taper engagement therewith. Each end of the sleeve 20 is coned or tapered at 36, and the flange 22 is carried backward and outward so as to produce a corresponding cone or incline 37 thereon. The peripheral portion 38 of the flange 22 has bolt holes through which a series of bolts 39 pass clear across the face of the sleeve 20 and draw the flanges 22 toward one another and tightly into the taper portions 36 of the sleeve 20.

The bearing 23 together with the integral flanges 22 is split, that is to say it is separated into two sections on a diametrical plane in a manner which is familiar with bronzes and boxes. This arrangement permits these bearings to be readily removed for inspection, repair or renewal. By the arrangement just described, the halves of the bronzes or bearings are kept tightly associated, since they are held together by the tapers 36 into which they are drawn. The operation of taking up wear in these bearings or in the clutch shoes or any interior part of the clutches, is simply to release the bolts 39 and then shift one or both bearings 23 slightly longitudinally until it is out of the tapering recess of the sleeve 20. Then the two halves of such bearing are simply lifted off. Thereupon the sleeve 20 can be shifted to permit the easy removal of the sections of the bearing at the opposite end. The sleeve of the adjacent clutch being similarly loosened and shifted, permits the whole interior of the first clutch to be exposed, and the yokes 25 can now be taken off, the shoes of course lifting out at once as soon as the sleeve 20 is out of the way. Thus the whole interior of the clutches is readily accessible at any time. If the bearings have been worn, the engaging faces of their split portions will be slightly faced off, the bearings rebored and re-turned, the material in the portions 38 of the flanges being sufficient to make a new taper of sufficient size, notwithstanding many such remachining operations. The wear on these bearings is very slight in any case, since they never have a wearing contact while power is being transmitted, but simply when no power is being transmitted. Thus the same set of bearings will outlast the life of any truck.

The movement of the two clutch rods $w$ effects a separation of the shoes 32 and the latter are pressed against the interior of the sleeve 20, although not with sufficient force unless the power of the movement of the clutch rods is very great. It will be evident that although the friction engagement between the shoes and the sleeves 20 is one which is likely to slip under ordinary pressures, still a finite pressure always exists which will be great enough to prevent slippage. In view of the strength of the shoes and the sleeve 20, there is practically no limit to the pressure which can be applied to them without danger of breakage, and the whole problem is one of getting a sufficient application of pressure from a practical power source to the wedges and of course without producing any end thrust on the transmission shaft while the latter is in rotation. It is this actuation which is furnished by an important feature of the present invention. and in the best embodiments thereof I make use of four air cylinders rigidly and co-axially fixed to the transmission shaft and acting on the clutch rods $x$, $y$, $z$ and $w$. The air of these two cylinders must be supplied to the transmission shaft in such a way as to avoid end thrust, avoid leakage and wear, and provide for the selective actuation of the air cylinders without of course subjecting the transmission shaft itself to appreciable friction or wear.

The air cylinders are designated at $W^a$, $X^a$, $Y^a$, $Z^a$, and I prefer them arranged in the inverse order with respect to their proper clutches, as shown in Fig. 1. With this arrangement the cylinder $w^a$ pulls on the rods $w$ to throw in the clutch W which is the high speed or direct drive clutch. The direct pull on a steel rod or a pair of steel rods is of course the most direct manner possible of transmitting power and great force can be carried through such a transmission limited only by the tensile strength of the steel. The cylinder $X^a$ is designed to push on the two clutch rods $x$ to operate the reverse speed clutch X. The cylinder $Y^a$ pulls on the two rods $y$ to operate the low speed clutch Y, and the cylinder $Z^a$ pushes on the two rods $z$ to operate the intermediate speed clutch Z. These last rods, being very short, are adapted to transmit the power by a push with high efficiency. The pull for the clutch Y is also highly efficient. The push for the clutch X is the least efficient of the set, but being the reverse gear is used the least and with the least necessity of perfection.

Referring now particularly to Fig. 2, a somewhat enlarged section of the air cylinders $Z^a$ and $Y^a$ is represented in the form which is adapted for ordinary purposes. Each cylinder 45 has an annular bore surrounding the hub 46 which is fixed with great security to the transmission shaft, preferably by yokes similar to the yokes 25 already described, and located between the two cylinders 45 in Fig. 2. For clearness however, this detail, which is obviously subject to considerable latitude of modifications, has been omitted from the illustration. 47 denotes pistons within the respective cylinders and guided partly by the wall of the cylinders and partly by the hubs 46, and partly by reduced flanges 48 embracing the transmission shaft C. 49 designates cup leather washers of the sort commonly known and understood in any air pressure apparatus. The air is admitted behind the pistons 47 through pipes $y^b$ and $z^b$ which are led along the transmission shaft in grooves or channels 50, as shown in Figs. 3, and 11 to 16.

The cylinders $W^a$ and $X^a$ are in all respects similar to the cylinders $Y^a$ and $Z^a$ just described and are supplied by air pipes $w^b$ and $x^b$.

In order to provide for the shifting of the clutch rods by pistons 47, I provide elongated lugs $x^1$, $y^1$, $z^1$ and $w^1$ on the respective clutch rods $x$, $y$, $z$ and $w$. These elongated lugs are integral parts of the rods in the best constructions and are impinged directly against by the flat end faces 48 of the pistons 47 when the piston is blown out by the air pressure, which force may amount to many tons if desired. The corresponding clutch rods are pushed or pulled with this same amount of force. This force is of course transmitted without diminution in the cases of the high and low speed clutches Y and W, and without sensible diminution to the intermediate clutch Z and without excessive diminution to the reverse speed clutch X. For ordinary purposes, the power application on the reverse speed clutch would be considerably less than with the forward speeds. The power is of course multiplied by the wedges five or ten fold, giving a gripping pressure of perhaps many tons on the clutch shoes. This pressure is much more than ample to grip the clutches against slippage on the heaviest trucks and on the steepest hills, notwithstanding the presence of lubricant on the interior of the clutches and their comparatively small diameter. As a matter of fact pressures very much less than those just mentioned will serve in practice. The oil quickly squeezes out from under the clutch shoes as soon as a predetermined pressure per square inch is reached, which varies with different lubricants, but which can be calculated. The oil will readily squeeze out and thereafter the slippage will entirely cease. The slippage is no disadvantage because it gives a softer gripping action, which is in effect the most desirable characteristic of a friction clutch. Of course the pressure of the air is also applied more or less gradually with the same result in view.

In order to release the clutches, a considerable application of force is also necessary, since they may become very tightly wedged in place. No springs can be relied upon for obvious reasons. I provide means which is substantially as direct and positive for the release of the clutches as is provided for their engagement, and the means for releasing the clutches is furthermore interlocking so that when any clutch is thrown in all the others are released. Each of the clutch rods $x$, $y$, $z$, and $w$ besides carrying the elongated lugs $x^1$, $y^1$, $z^1$ and $w^1$ already described, carries two other lugs which have the purpose or function of being engaged by the pistons of two other of the air cylinders. That is to say each clutch rod besides having an elongated lug engaged by the piston particularly provided for operating the clutch rod, has two lugs which are respectively engaged by two of the remaining pistons. The purpose is to cause a retraction of this clutch rod when either of these two last mentioned pistons is projected outward. It will be observed that there remains a fourth or final piston which is entirely without action on any lug of any such particular clutch rod, and this fact will be taken up in time. For the present it is sufficient to consider the action of the elongated lugs on the clutch rods. Without making any detail description of the location of the various elongated lugs on the clutch rods, it is sufficient to refer to Figs. 9 to 16 inclusive which are sections on the planes 9, 10, 11, 12, 13, 14, 15 and 16 of Fig. 1, looking in the direction of the arrows. In these figures every elongated lug appears one or more times and their location will be readily ascertained. For convenience, the elongated lugs operated by the cylinder $X^a$ for engaging the clutch X are designated $x^1$, while those elongated lugs which are on the same rod $x$ but are engaged by the cylinders $Y^a$ and $W^a$ are designated $x^y$ and $x^w$, etc. Some of the elongated lugs at the middle of the system of air cylinders merge into one another thus forming a single elongated lug of double length. This is an advantage as it promotes the strength and rigidity, but in the illustration of Figs. 9 to 16 the two end portions of such double length lug are separately designated by the notation just mentioned. From this notation there will be no difficulty in tracing out any particular action.

There remains to be considered the means for retracting any given clutch rod when the fourth or final piston alluded to in the preceding paragraph is actuated. In the most satisfactory practice embodying the invention there will be a group of bell crank levers intergeared together as best shown in Fig. 1.

51 designates a series of bell cranks of identical construction, all having gear segments 52 which mesh, and also forked arms 53 which carry rollers 54. Fig. 2 may be particularly referred to, to show the position of the forked arms 53 and the rollers when viewed in a horizontal direction. It will be observed that there are a pair of rollers 54 opposite every flange 48 of each air piston, and furthermore the projection of any particular air piston is accompanied by a pushing back of that other particular air piston which has not been provided for the system of lugs already described. This will not retract the clutch rods unless the latter has a retraction engagement with the corresponding piston flange 48 as well as an abutting engagement therewith as already described. For this purpose another lug, such as $z^n$ or $y^n$ Fig. 2, is arranged on this clutch rod on the interior of the flange 48, and the hub on the air cylinder is recessed as at $y^m$ to accommodate the said interior lug. In view of the fact that these clutch rods invariably move with the pistons which actuate them, the outside lugs $z^1$ and $y^1$ may have screws $s$ which serve as a temporary holding or fastening means during the assembling of the mechanism, and constitute an index or guide as to the way the assembling will be done. They serve no particular purpose in the operation, being too feeble to give any particular service, and may be omitted altogether.

Figure 3:
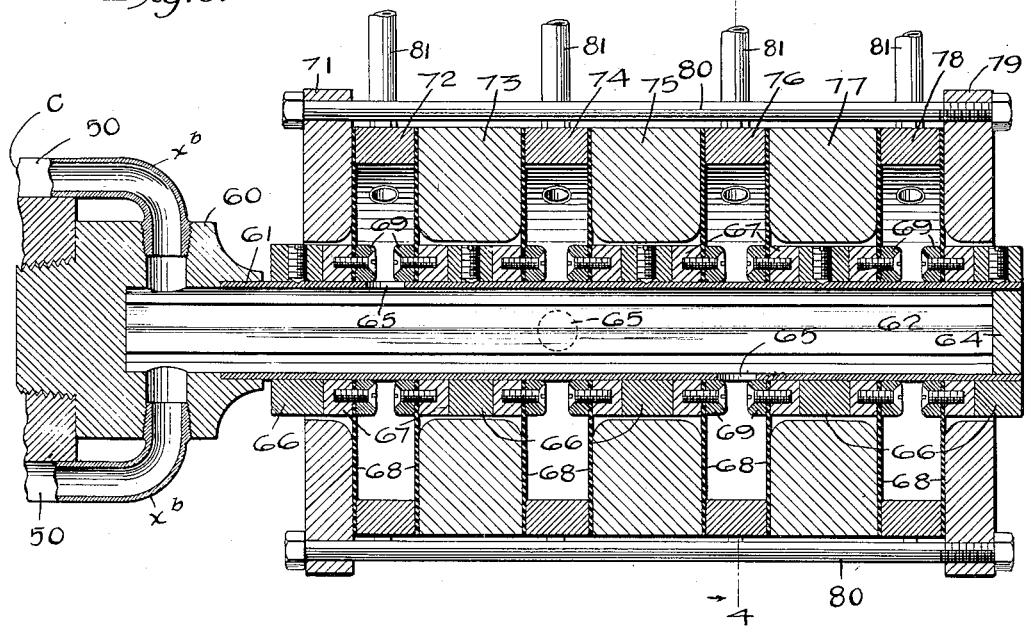
Fig. 3, is a similar somewhat enlarged section taken to the extreme right of Fig. 1, and showing parts which are broken away in Fig. 1.
Figure 4:
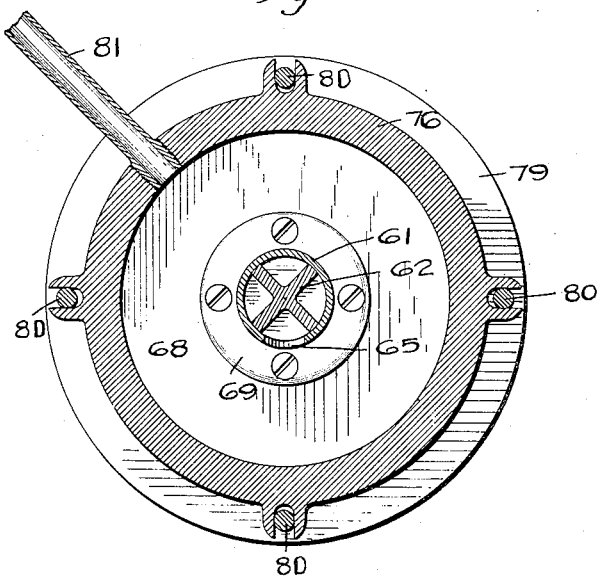
Fig. 4, is a section on the line 4—4 of Fig. 3.
Figure 9:
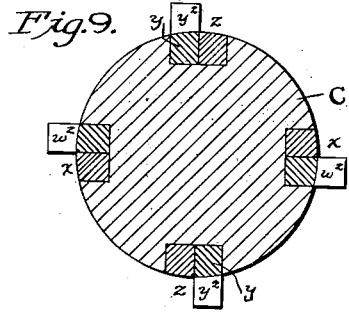
Figure 10:
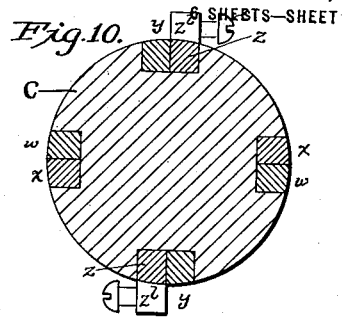
Figure 11:
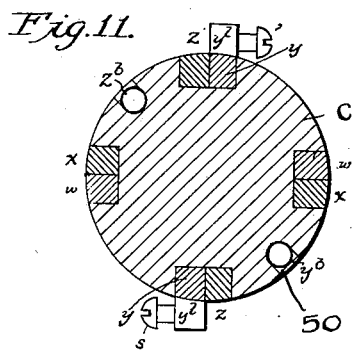
Figure 12:
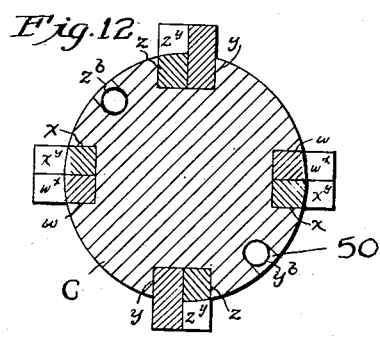
Figure 13:
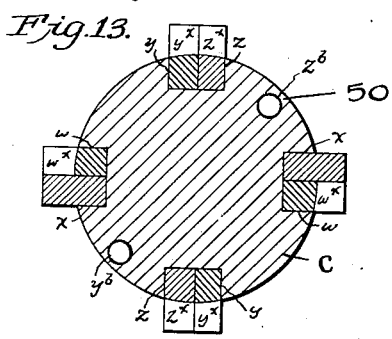
Figure 14:
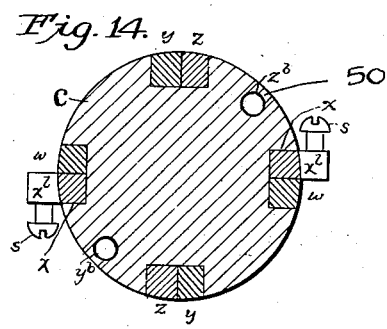
Figure 15:
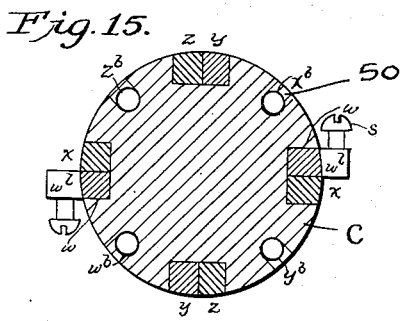
Figure 16:
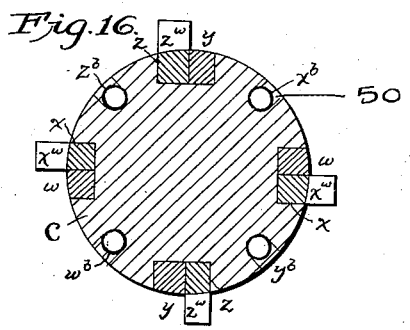

Air is admitted to the cylinders $X^a$, $Y^a$, $Z^a$ and $W^a$ through the pipes $x^b$, $y^b$, $z^b$ and $w^b$, and these pipes emerge at the right-hand end of the shaft C in Fig. 1, as particularly shown in Fig. 3. At this point the shaft is greatly reduced in diameter and virtually converted into a small tube with four air passages, preferably by having a plug 60 attached to the end of the shaft, and itself carrying the tube 61 so that the latter rotates with perfect true on its own cylindrical axis. The tube 61 has four passages which are conveniently formed by a cross-shaped bar 62 sweated into the tube 61, and these passages communicate with the respective pipes 50 within the plug 60. The tube is closed at the right-hand end by a suitable plug 64, and there are a series of openings 65 in the wall of the tube which communicate with the respective interior passages. On the outside of the tube are formed a series of tightly fitting collars 66, the respective collars being disposed at equal distances on opposite sides of the openings 65. Between these collars are substantially fixed collars 67 forming part of diaphragms 68, being clamped thereto by clamping rings 69. The diaphragms 68 are of flexible material and are clamped between a series of fixed rings 71, 72, 73, 74, 75, 76, 77, 78 and 79. These various rings are drawn together in one compact unit organization by the bolts 80. Each of the rings 72, 74, 76 and 78 has an air pipe 81 which admits air to the interior of the ring. This air pressure is adapted to pass directly through an opening 65 opposite this particular ring, and accordingly the air pressure which is selectively applied to the interior of the rings 72, 74, 76 and 78, is thereby correspondingly selectively applied to the air pressure cylinders $X^a$, $Y^a$, $Z^a$ and $W^a$. It is to be noted that the air pressure does not produce any unbalanced end thrust on the transmission shaft, and it is further to be noted that the air pressure itself maintains the collars 67 attached to the diaphragms tightly against the rotating collars 66 on the transmission shaft, and this regardless of wear, so that there will be no leakage notwithstanding continued use. The air is supplied selectively to the pipes 81 from an ordinary engineer's valve which forms no part of the present invention.

The foregoing provides for the selective operation of any of the clutches X, Y, Z and W, and will run the car at any of its speeds and will provide for shifting from one speed to another without any shock or jar, since all the other clutches are automatically released before any one clutch can be engaged, and the engagement is in all cases purely by friction and between surfaces which may be and ordinarily will be initially covered with a lubricant. Only one other condition needs to be considered, and that is the stopping condition. In order to stop the car all of the clutches must be released, and at the same time the brake will be actuated. If for any reason there is a desire to run the car entirely idle and unclutched from the engine, as might happen for example when being towed, this also can be readily provided for. Thus every traffic condition is provided for.

The best constructions embodying the invention will include a pair of disks 90 fixed to the transmission shaft, as shown in Fig. 1, and more particularly illustrated in Figs. 7 and 8. In order to get the proper security I prefer to have the transmission shaft squared throughout the length thereof opposite the disks 90, and make the disks split or in two halves clamped together by bolts 91. The form of the square central aperture of the disks will be modified in a manner substantially similar to that of the segmental yokes 25 already described. The disks 90 are separated a distance somewhat greater than four times the stroke or throw of the pistons 47 already described, and they include between them an annular cylinder 93 and an annular piston 94 with a cup leather washer or packing 95, both the cylinder 93 and the piston 94 having notched flanges 96, 96' these notches being adapted to receive a plurality of fixed or stationary bars 97 forming part of the frame of the machine, and which may be merely integral ribs on the interior of the casing of the transmission mechanism. 98 denotes an air pipe for the cylinder 93 which is drawn into a coil or helix 99 terminating in a fixed inlet pipe 100, the diameter and number of convolutions of the helix being sufficient to permit a considerable movement of the cylinder 93 in a longitudinal direction. As a matter of fact the cylinder 93 is designed to have a movement exactly equal to that of the piston 94, each movement being equal to the throw of the air pistons 47 already described.

$w^p$, $x^p$, $y^p$ and $z^p$ indicate elongated lugs on the clutch rods W, X, Y and Z, and which are located within or directly under the disks 90 when all the clutches are disengaged. As illustrated in Fig. 7, the elongated lugs $w^p$ and $y^p$ are at the left-hand side, while the lugs $x^p$ and $z^p$ are at the right-hand side. The result is that all the lugs move toward the space between the disks 90 when they travel away from their normal positions of clutch disengagement. In this latter movement the lugs impinge respectively against the cylinder 93 or the piston 94, and the travel and method of mounting of the cylinder and piston is such as to permit this movement of the clutch rods to take place to the full extent necessary for engaging the various clutches. On the other hand, when the piston 94 is blown outward in the cylinder 93 to the fullest extent, as illustrated in Fig. 7, the action of the cylinder and piston in engaging the lugs $w^p$, $x^p$, $y^p$ and $z^p$ is to unclutch every one of the clutches X, Y, Z and W. At the limit when the cylinders 93 and the piston 94 are prevented from further movement by engaging the disks 90, they act as an exceedingly efficient brake, with a comparatively large wear and heat dissipating surface. The action of the brake will be heavy or light and is controllable in the same manner as any air brake. Conversely when any one of the clutches is thrown in the brake is positively disengaged. The brake, of couse is operated by the same engineer's valve that operates the various clutches, and which will be constructed in any known manner, so that under no circumstances can air be applied to more than one pipe line at once, the others being opened to the atmosphere. The engineer's valve will also have a handle position where all of its various air pipes are open to the atmosphere, and this handle position is adopted for certain purposes, after the brake has been applied, so as to permit the car to be run idle, or in other words entirely unclutched from the engine. This is done when the car is being towed and perhaps in coasting.

A modified construction is illustrated in Figs. 17 and 18, somewhat diagrammatically. By this arrangement the bell cranks 51 already described are each divided into an upper and lower portion $51^u$ and $51'$, with correspondingly divided gear segments $52^u$ and $52'$. This divides the bell crank system into completely independent upper and lower halves. There is nothing to prevent the halves working in unison for the purpose already described, but they are also adapted to be worked out of unison, or in other words opposite to one another when the brake is applied. For this purpose the brake, designated 105, has a pull rod 106 with stops 107, which engage arms 108 and 109, of which 108 forms an actuator for the lower half of the bell crank system, while 109 forms an actuator for the upper half of the bell crank system. The two systems will be rocked in opposite directions. The result is to throw all of the pistons 37 inward whenever the brake is actuated, and to throw the brake off when any piston is actuated.

What is claimed is,—

1. In a transmission mechanism, a shaft, clutches, longitudinally sliding rods for operating the clutches, and power means included and arranged as part of the rotatable elements and system on the shaft for selectively displacing said rods longitudinally.

2. In a transmission mechanism, a shaft, a plurality of friction clutches, a plurality of longitudinally sliding rods for actuating the same, and a series of independent power means fixed to said shaft and rotating therewith for displacing said rods longitudinally.

3. In a transmission mechanism, a counter shaft, gears fixed thereto, a transmission shaft, clutches thereon, gears connected thereto, and a series of independent air cylinders coaxially mounted on and rotating with said transmission shaft, and connections to the respective clutches.

4. In a transmission mechanism, a transmission shaft having longitudinal spline grooves, rods sliding in said grooves, clutches operated by said rods, gears carried by the clutches, a counter shaft having gears meshing therewith, and power means on said transmission shaft for selectively moving said clutch rods longitudinally.

5. In a transmission mechanism, a shaft having longitudinal grooves, rods sliding in said grooves and having wedges thereon, clutches operated by said wedges, gears for rotating the clutches at different speeds, and power means on the transmission shaft for moving said rods longitudinally.

6. In a transmission mechanism, a shaft having longitudinally extending grooves, clutches having split bearings and an integral sleeve embracing said bearings and interior shoes working on said sleeves, rods sliding longitudinally with respect to said shaft to actuate the respective clutches, and power means on said shaft for sliding said rods longitudinally.

7. In a transmission mechanism, a shaft, clutches, said clutches each comprising split bearings, an integral sleeve embracing said bearings, shoes, and clamps embracing said transmission shaft, sliding rods having wedges engaging said shoes for the respective clutches, and power means on said shaft for moving said sliding rods.

8. In a transmission mechanism, a transmission shaft, clutches thereon, said clutches comprising a pair of split bearings with taper peripheries, an integral sleeve having internally tapered ends, shoes within said sleeves, clamps engaging said shoes and said shaft, sliding rods having wedges working against said shoes, and power means on said shaft for moving said rods longitudinally.

9. In a transmission mechanism, a transmission shaft, a series of clutches thereon, said clutches comprising bearings, a sleeve, and interior shoes, sliding rods having wedges engaging said shoes, and a series of power means, said power means displacing said rods longitudinally, said power means being interlocking to prevent the simultaneous engagement of two clutches.

10. In a transmission mechanism, a transmission shaft, a series of clutches, said clutches comprising a sleeve and interior shoes, longitudinally sliding rods for displacing said shoes, a series of air cylinders on the transmission shaft, connections therefrom for operating said rods, said air cylinders having an actual interlocking action, whereby two clutches will not be simultaneously engaged.

11. In a transmission mechanism, a transmission shaft, four clutches thereon, gears for rotating said clutches, shoes within the clutches, longitudinally sliding rods on said transmission shaft for displacing said shoes, and four air cylinders arranged in oppositely directed pairs, having an actual interlocking action, whereby two clutches will not be simultaneously engaged.

12. In a transmission mechanism, a transmission shaft, a series of clutches on said shaft, gears for rotating said clutches at different speeds, interior shoes for said clutches, rods sliding longitudinally on said shaft for displacing said shoes, and a series of air cylinders on said shaft connected to said rods to operate the clutches.

13. In a transmission mechanism, a transmission shaft, a series of clutches thereon, shoes within the clutches, a plurality of rods sliding on said shaft having wedges engaging said shoes, and a series of air cylinders concentrically fixed on said shaft, said air cylinders being arranged in oppositely directed pairs, and lugs on said rods operated by the air cylinders.

14. In a transmission mechanism, a transmission shaft, a series of clutches thereon, gears for operating said clutches at different speeds, a series of air cylinders fixed on said shaft in oppositely directed pairs, rods having wedges forming part of the clutches, a series of lugs on said rods operated by said air cylinders, and means whereby the lugs are operated by a plurality of cylinders to be retracted thereby.

15. In a transmission mechanism, a transmission shaft, a series of clutches thereon, gears for operating said clutches at different speeds, rods having wedges forming part of the clutches, and a series of annular air cylinders fixed concentrically on said shaft, and connected to said rods, said cylinders being in opposite pairs.

16. In a transmission mechanism, a transmission shaft, a series of clutches thereon, longitudinally extending rods forming part of the clutches, a series of air cylinders fixed to said shaft, means for operating said rods from the air cylinders, and means for positively retracting one air cylinder when another is operated to engage a clutch.

17. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, and shoes forming part of said clutches and operated by said rods.

18. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, shoes forming part of said clutches and operated by said rods, and means for positively retracting said rods.

19. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, shoes forming part of said clutches and operated by said rods, and means positively acting on said rods to transmit motion thereto from a plurality of cylinders to retract said rods.

20. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, and shoes forming part of said clutches and operated by said rods, said rods having lugs acted upon by a plurality of cylinders to retract the rods.

21. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, shoes forming part of said clutches and operated by said rods, and means for positively retracting each rod when any cylinder other than the proper operating cylinder for each rod is actuated.

22. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, shoes forming part of said clutches and operated by said rods, a pair of cylinders having direct opposite engagements to retract said rods, and means for positively retracting the rods when the cylinders which do not have a direct engagement therewith are operated.

23. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, and shoes forming part of said clutches and operated by said rods, the cylinders having flanged pistons, a plurality of which directly engage said rods to advance or retract the same.

24. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, and shoes forming part of said clutches and operated by said rods, said cylinders having pistons engaging said rods with a direction of movement parallel to the rods to advance or retract the latter.

25. In a transmission mechanism, a transmission shaft, a series of clutches thereon, gears for operating said clutches at different speeds, a series of air cylinders fixed to said shaft in oppositely directed pairs, longitudinally sliding rods on said transmission shaft, and shoes forming part of said clutches and operated by said rods, each of said rods having three lugs positively impelled by a direct push from different cylinders.

26. In a transmission mechanism, a transmission shaft, a series of clutches having shoes and operating rods, said rods extending longitudinally on the transmission shaft, four cylinders with pistons in pairs back to back, and lugs on each of said rods respectively engaged by three of the four pistons.

27. In a transmission mechanism, a transmission shaft, four clutches thereon, the first of which is high speed, the second reverse speed, the third low speed and the fourth intermediate speed, rods extending longitudinally of the shaft for operating said clutches, and power means on the shaft for operating said rods, said power means being in the inverse order to that of the clutches.

28. In a transmission mechanism, a transmission shaft, a series of clutches thereon having shoes and longitudinally extending rods, a series of air cylinders, a plurality of which have a direct operating engagement with said rods, and bell crank levers for operating said rods from the remaining cylinders.

29. In a transmission mechanism, a transmission shaft, clutches having shoes and operating rods extending longitudinally of said shaft, cylinders on said shaft, a plurality of which have a direct operating engagement with said rods, and a plurality of pairs of bell crank levers with connecting gear segments for transmitting the removement of the remaining cylinders to said rods.

30. In a transmission mechanism, a transmission shaft, a plurality of clutches having shoes and operating rods extending longitudinally of said shaft, a series of annular cylinders fixed to said shaft for operating said rods, and a corresponding number of air pipes extending from said cylinders to the end of the shaft.

31. In a transmission mechanism, a transmission shaft, a plurality of clutches having shoes and operating rods extending longitudinally of said shaft, a series of annular cylinders fixed to said shaft for operating said rods, and a corresponding number of air pipes extending from said cylinders to the end of the shaft, said shaft having means for admitting air from stationary pipes selectively to the pipes on the shaft.

32. In a transmission mechanism, a transmission shaft, a plurality of clutches having shoes and operating rods extending longitudinally of said shaft, a series of annular cylinders fixed to said shaft for operating said rods, a corresponding number of air pipes extending from said cylinders to the end of the shaft, said shaft having a small tubular extension with partitions, and means for admitting air to the respective partitions of said tubular extension.

33. In a transmission mechanism, a transmission shaft, a plurality of clutches having shoes and operating rods extending longitudinally of said shaft, a series of air cylinders fixed to said shaft and acting directly on said rods, a plurality of pipes extending along said shaft for the respective cylinders, and diaphragms having collars to establish air pressure connections thereto from a fixed source.

34. In a transmission mechanism, a transmission shaft, a series of clutches having shoes and operating rods extending along said shaft, a series of cylinders fixed to said shaft, and operating rods, air pipes along the shaft, a reduced extension having passages communicating with said pipes, collars on said extension, diaphragms expanding against said collars, and means for admitting air to the spaces between said diaphragms.

35. In a transmission mechanism, a transmission shaft, a series of clutches having shoes and operating rods extending along said shaft, a series of cylinders fixed to said shaft and directly acting on said rods, a brake, connections from said brake for retracting all of the rods to disengage the clutches.

36. In a transmission mechanism, a transmission shaft, a series of clutches on said shaft, operating rods for said clutches extending along the shaft, power means on said shaft for operating said rods, each of said power means advancing a particular rod, and all the other power means having a retraction engagement with said rod.

37. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, and means on said shaft for supplying power to the respective power means from a fixed source.

38. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a brake, and means for retracting all of said rods when the brake is actuated.

39. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a brake, means for retracting all of the said rods when the brake is actuated, and means for retracting the brake when any rod is advanced to engage the clutch.

40. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a brake on said transmission shaft, and having a braking movement longitudinally of said shaft, said brake having a direct push and pull engagement to retract all of said rods when thrown into action.

41. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a brake, and connections from said brake to all of said rods to retract the same when the brake is actuated, said connections permitting an individual movement of the rods to the full extent necessary for engaging a clutch.

42. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a brake comprising two disks fixed to the transmission shaft, a cylinder and piston between said disks, and means on the clutch rods engaged by both the cylinder and piston.

43. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, and a brake having annular surfaces engaging by a movement longitudinally of said shaft, said brake having a direct push and pull engagement with the rods to release all the clutches when the brake is actuated.

44. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a brake having annular surfaces engaging by a movement longitudinally of the shaft, said brake having a direct push and pull engagement with said rods, and a resilient air pipe connected to said brake to permit incidental movement thereon.

45. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a pair of disks fixed to said shaft, an annular cylinder and an annular piston between said disks and both having a movement longitudinally of said shaft, lugs on said rods engaged by both the cylinder and piston, and a flexible air pipe.

46. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a pair of disks fixed to said shaft, a piston and cylinder acting on said disks and having notched flanges, and fixed bars in the notches of said flanges.

47. In a transmission mechanism, a transmission shaft, a series of clutches on said shaft, operating rods for said clutches extending along the shaft, power means on said shaft for operating said rods, each of said power means advancing a particular rod, all the other power means having a retraction engagement with said rod, a pair of split disks clamped on said shaft, and a power brake acting between said disks and having an operating engagement with said rods.

48. In a transmission mechanism, a transmission shaft, a series of clutches on said shaft, operating rods for said clutches extending along the shaft, power means on said shaft for operating said rods, each of said power means having a particular rod, all the other power means having a retraction engagement with said rod, said shaft having square portions, split disks with square holes clamped upon said square portions of the shaft, and braking means between said disks and acting on said rods.

49. In a transmission mechanism, a transmission shaft, a plurality of clutches having operating rods extending along said shaft, a series of air cylinders having pistons having an abutment engagement with said rods, said rods further having lugs arranged on the interior of said pistons to retract the rods.

50. In a transmission mechanism, an engine shaft, a transmission shaft in alinement therewith, a clutch between said shafts, other clutches on the transmission shaft, a counter shaft, gear connections between said clutches and counter shaft, power means on the transmission shaft for selectively engaging said clutches, and a brake on the transmission shaft for simultaneously releasing all the clutches.

51. In a transmission mechanism, an engine shaft, a transmission shaft in alinement therewith, a clutch between said shafts, other clutches on the transmission shaft, a counter shaft, gear connections between said clutches and counter shaft, power means on the transmission shaft for selectively engaging said clutches, and a brake on the transmission shaft for simultaneously releasing all the clutches, said power means having an interlocking engagement, substantially as described.

52. In a transmission mechanism, a shaft, clutches thereon, means extending longitudinally of the shaft for operating the clutches, and operating means therefor, said operating means having an interlocking action whereby two clutches cannot be engaged simultaneously, said operating means being included and arranged as part of the rotatable elements and system of the shaft.

53. In a transmission mechanism, a shaft, clutches thereon capable of being slippingly engaged, means extending longitudinally of the shaft for separately engaging said clutches, a plurality of independent power means on the shaft, and means for preventing the simultaneous actuation of two power means.

Signed at New York, in the county of New York and State of New York, this 16th day of November, A. D. 1911.

ALFRED W. PROCTOR.

Witnesses:
GRACE T. DIXON,
E. A. SINGER.